Oct. 14, 1969  A. G. DEAN  3,472,345

VANED DISK ELEMENT AND MEANS TO PREVENT AIR FLOW THERETHROUGH

Filed Oct. 9, 1968

INVENTOR.
Albert G. Dean
BY William R. Nolte
AGENT

United States Patent Office 3,472,345
Patented Oct. 14, 1969

3,472,345
VANED DISK ELEMENT AND MEANS TO PREVENT AIR FLOW THERETHROUGH
Albert G. Dean, Narberth, Pa., assignor to The Budd Company, Philadelphia, Pa., a corporation of Pennsylvania
Filed Oct. 9, 1968, Ser. No. 766,215
Int. Cl. F16d 65/84
U.S. Cl. 188—264                    3 Claims

ABSTRACT OF THE DISCLOSURE

A fuse-like seal for disk brake rotors used for heavy duty railway service. A band of material meltable at a predetermined temperature range is affixed about the periphery of a rotor having radial braking disk elements connected by spaced cooling vanes.

---

Present day high speed train for service between Washington and New York employ electric (dynamic) braking at high speeds, and conventional wheel disk brakes for braking at low speeds. Such cars are designed to utilize dynamic braking from speeds between 160 and 30 m.p.h., and thereafter to employ wheel brakes from 30 m.p.h. to 0 m.p.h. When dynamic braking is used the motors and gear boxes do all of the work from top speed down to 30 m.p.h. From 30 m.p.h. and below the wheel brakes take over the braking effort. The latter wheel brakes employ disk brake rotors which comprise an integral one-piece off-wheel radial disk with axially spaced radial braking disk friction plates connected by spaced radial cooling vanes. The cooling vanes define air flow spaces to enable the flow of air between the disk element and the vanes. An inner hub is adapted to be secured to the side of a wheel or axle and an intermediate bell shaped connecting portion supports the disk on the hub. Due to the aforementioned construction the rotation of such a disk at a speed of 160 m.p.h. will consume on the order of 18 horsepower, circulating air, whether it is needed for cooling or not. Moreover, since each truck carrying such wheel axle units would carry at least four such disks it can be seen that the horsepower drain of such disks would approach a very significant loss. It is consequently necessary to control such horsepower loss.

A particular requirement of the braking systems of such high speed cars further is that the wheel brakes have the capability of braking the cars in the event of malfunction of the dynamic brakes. It is of interest to note in this connection that at 160 m.p.h. the kinetic energy of a 172,000 pound car is about 147,000,000 foot pounds or 188,000 B.t.u.'s, and at 120 m.p.h. about 80,000,000 foot pounds or 106,000 B.t.u.'s. The actuation of the brake shoes against the rotating disk plates would consequently create tremendous amounts of heat which would have to be dissipated. It is seen from the foregoing that when the dynamic brakes are functioning properly there is a necessity to control the air flow through the disk assemblies and thus eliminate the horsepower drain at each of the disks. However, in the event of malfunction or failure of the dynamic brakes it is equally clear that the cooling vanes must be opened to permit the greatest possible amount of air flow through the disk assemblies.

It is therefore the principal object of this invention to provide an improved ventilation control apparatus for disk brakes which avoids one or more of the disadvantages of the prior art arrangements.

It is a further object of this invention to provide an improved ventilation control apparatus for a brake disk attached to a wheel axle unit of a vehicle in which air flow through the brake disk is prevented during a predetermined temperature range and in another mode of operation air flow is permitted through said disk corresponding to another temperature range of said brake disk.

In accordance with the invention a brake rotor for an off-wheel brake arrangement is provided in which the rotor is frictionally engaged between a pair of brake shoes during deceleration of a railway car. The rotor in the present instance comprises a pair of spaced friction plates which are interconnected by means of radial fins to define air passages. A band of material encircles the outer perimeter of the rotor in a manner to block the flow of air through the passages and is of a material which will melt at a predetermined temperature range. When the rotor is rotated at very high rates of speed the heat generated during frictional engagement of the brake shoes against the friction plates exceeds the melting range of the band of material. The encircling band is thus caused to distintegrate and separates from the rotor, thereby opening the passageways for the flow of cooling air to dissipate a portion of the heat so generated.

For a better understanding of the present invention, together with other and further objects thereof, reference is had to the following description taken in connection with the accompanying drawing and its scope will be pointed out in the appended claims.

Figure 1:
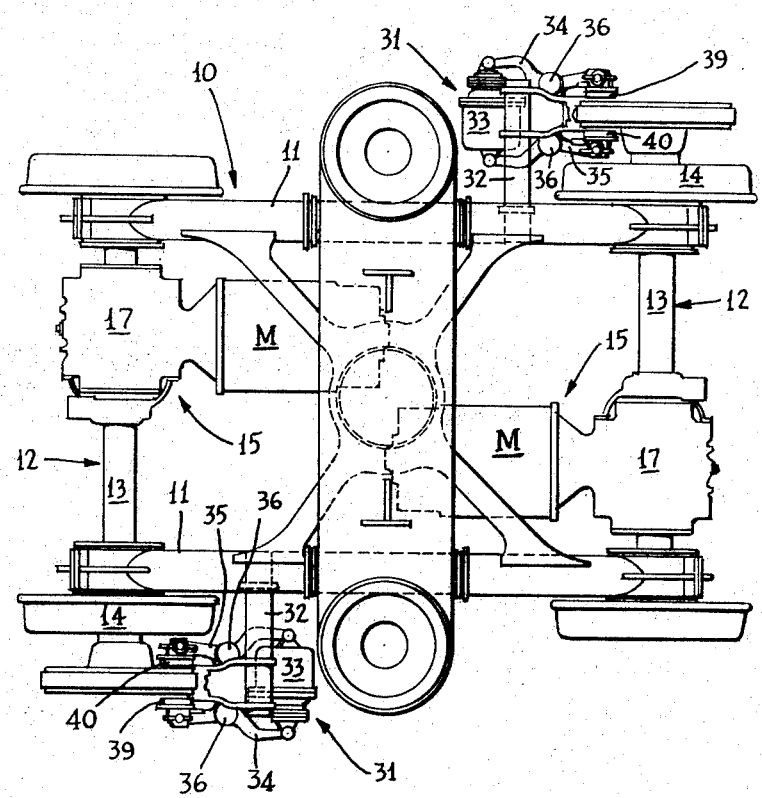
FIG. 1 is a partial plan view of a truck including a wheel-axle unit with a portion of the rotor shown in section.

Referring to the drawing there is shown a truck 10 for a railway passenger vehicle which has not been illustrated. The truck includes side frames 11, wheel axle-unit 12 including axle 13 and wheel 14. Dynamic braking apparatus 15 is provided to decelerate the vehicle. The apparatus includes an electric motor M and a gear box 17. The electric motor is secured to the side frame by suitable motor mounts. The gear box 17 is connected to the motor M and to axle 13 to normally transmit power from the motor to propel the vehicle in a given direction and at a desired speed. When a braking command is given, the dynamic braking mode is energized in which the motor currents are reversed. The motor and gear box thus work to slow down the rotation of the wheel-axle unit.

A brake rotor 19, in the present instance a one-piece iron ring casting, is interconnected to the hub 20 of wheel 14 by a bell-shaped web 21. The rotor is positioned outboard of the wheel and includes axially spaced annular inner and outer friction plates 23, 25 which in turn are interconnected by circumferentially spaced radial ribs or fins 26 which define air passages 27. The remote outermost surfaces 28, 29 of the plates 23, 24 present flat annular parallel, friction surfaces. A unit air brake assembly 31 is mounted on support 32 extending from the side frame. The assembly includes an air actuator 33, tong levers 34, 35 fulcrumed as at 36, 37, to support frame 32. The outer ends of the tong levers carry brake shoes 39, 40. When the air actuator is suitably energized in another mode of operation the inner ends of the levers are caused to pivot in a direction to cause the brake shoes to be clamped into engagement with the friction surfaces.

Figure 2:
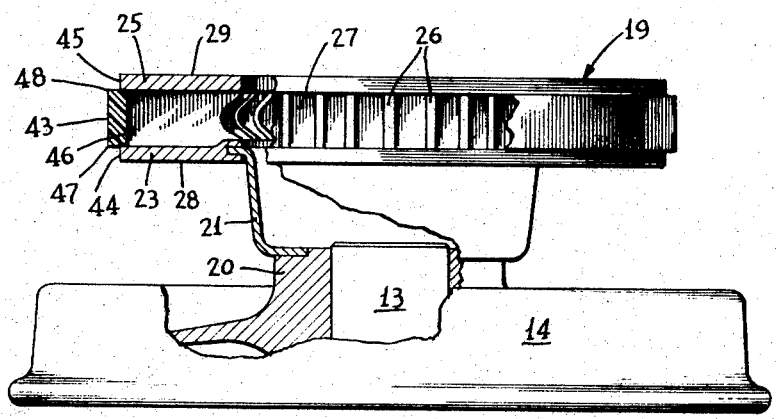
FIG. 2 is a plan view, greatly enlarged and partially in section, showing the band in place on the rotor.

In accordance with the invention, cover means 43 are provided for the rotor to prevent it from consuming high rates of horsepower while rotating at high speeds; and upon malfunction of the dynamic braking apparatus enable the flow of air through the rotor. In the present instance the cover means 43 constitutes an endless band of resilient material having a melting range between 300° F. and 400° F. The band in one form of the invention may be of a suitable plastic material such as nylon, vinyl, or rubber having a slight resilience to enable it to be slipped around the outer periphery of the friction plates 23, 25. As seen in FIG. 2, the band is shown to be of a width equal to that of the fins 26. The outer margins of the friction plates extend outwardly beyond the outer transverse edges 46 of the fins 33. Since the material chosen is capable of stretching a slight amount, the band may be positioned in place so that the side edges 47, 48 of the band are gripped by the marginal edge portions 44, 45 of the friction plates 23, 25. The inner surface of the band coacts with the outer edges 46 of the fins.

Normally during high speed rotation of the rotor 19 the band 43 is effective to prevent the flow of air through the rotor thereby eliminating a possible power loss. When the dynamic braking mode of the motor is energized by suitable reversal of electric current through the motor, the deceleration of the rotation of the wheel-axle is accomplished. In this mode the electric motor and gear box do the work to dissipate the energy of motion of the vehicle. When the speed of the vehicle is reduced to a predetermined level the air brakes through actuator 33 are actuated. The actuator through tongs 34, 35 causes the brake shoes 39, 40 to grip friction surfaces 28, 29 to bring the vehicle to a final stop with the temperature of the friction plates staying below 300° F.

In the event of malfunction or failure of the electric dynamic brake at high speeds of movement of the vehicle and upon application of the air brakes, tremendous amounts of heat will be generated in the friction plates 23, 25. The temperatures of the plates may exceed 800° F. to 1000° F. The band 43 subjected to such heat will quickly melt away permitting full flow of air through the passageways with adequate cooling of the rotor. Thereafter when the electric brakes are repaired a new band 43 may be positioned on the rotor. If it is forgotten more power will be used but no damage will be done to the rotor.

While the preferred form of material of the band is considered to be a form of plastic, or rubber, it should be apparent that a band of metal in the form of a suitable alloy meltable between 300° F. and 400° F. may be placed in encircling relationship about the periphery of the rotor.

While there has been described what at present is considered to be the preferred embodiment of this invention, it will be obvious to those skilled in the art that various changes and modifications may be made therein without departing from the invention and it is therefore aimed in the appended claims to cover all such changes and modifications as fall within the true spirit and scope of the invention.

What is claimed is:

1. Brake apparatus for a railway vehicle, comprising in combination, a disk having a pair of spaced plates, a plurality of spaced fin elements interconnecting said spaced plates and defining air passageways for cooling the plates, means disposed around said fins to normally block the flow of air through the passageways, brake shoe means including actuator means for engaging said spaced plates whereby upon build-up of temperature in said disk to a predetermined range said means disposed around said disk is caused to melt to open the passages for the flow of air therethrough.

2. In the brake apparatus as set forth in claim 1 wherein said means disposed around said fins to block the flow of air through the passageways constitutes an endless band of nylon material.

3. In the brake apparatus as set forth in claim 1 wherein said means disposed around said fins to block the flow through the passageways constitute an endless resilient band of rubber material.

References Cited

UNITED STATES PATENTS 3,378,117    4/1968    Stacy.

GEORGE E. A. HALVOSA, Primary Examiner

U.S. Cl. X.R.

192—113